United States Patent
Leitao et al.

(10) Patent No.: US 11,755,753 B2
(45) Date of Patent: Sep. 12, 2023

(54) MECHANISM TO ENABLE SECURE MEMORY SHARING BETWEEN ENCLAVES AND I/O ADAPTERS

(71) Applicant: KYNDRYL, INC., New York, NY (US)

(72) Inventors: Breno H. Leitao, Araraquara (BR); Mauro Sergio Martins Rodrigues, Campinas (BR); Daniel Battaiola Kreling, Santa Barbara D'Oeste (BR); Rafael Camarda Silva Folco, Santa Barbara D'Oeste (BR)

(73) Assignee: Kyndryl, Inc., New York, NY (US)

( * ) Notice: Subject to any disclaimer, the term of this patent is extended or adjusted under 35 U.S.C. 154(b) by 633 days.

(21) Appl. No.: 16/007,665

(22) Filed: Jun. 13, 2018

(65) Prior Publication Data
US 2019/0384923 A1 Dec. 19, 2019

(51) Int. Cl.
*H04L 9/00* (2022.01)
*G06F 21/60* (2013.01)
(Continued)

(52) U.S. Cl.
CPC ........ *G06F 21/606* (2013.01); *G06F 9/45558* (2013.01); *G06F 13/24* (2013.01);
(Continued)

(58) Field of Classification Search
CPC .... G06F 21/606; G06F 13/28; G06F 13/4081; G06F 9/45558; G06F 13/24;
(Continued)

(56) References Cited

U.S. PATENT DOCUMENTS 8,756,695 B1 * 6/2014 Golomb ................ G06F 21/563
370/328
8,930,714 B2 1/2015 Glew et al.
(Continued)

FOREIGN PATENT DOCUMENTS

WO WO-2017152633 A1 * 9/2017

OTHER PUBLICATIONS

Virtual I/O Server, Pertinent pp. 91-92 & 144-145 https://www.ibm.com/support/knowledgecenter/POWER6/iphb1/iphb1.pdf?view=kc (Year: 2007).*
(Continued)

*Primary Examiner* — Daniel B Potratz
*Assistant Examiner* — Syed M Ahsan
(74) *Attorney, Agent, or Firm* — CANTOR COLBURN LLP; Dan Housley

(57) ABSTRACT

Secure memory sharing between enclaves (virtual machines) and virtual input/output adapters includes, in response to a request for an enclave to create a virtual input/output adapter, creating a virtual input/output adapter associated with the enclave, creating a non-sharable micro-enclave, to contain only data, nested within the enclave to use with the virtual input/output adapter, generating a key by a memory encryption engine of an ultravisor for the virtual input/output adapter for use by only the virtual input/output adapter, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

19 Claims, 9 Drawing Sheets

(51) Int. Cl.
G06F 13/28 (2006.01)
G06F 13/40 (2006.01)
H04L 9/08 (2006.01)
G06F 9/455 (2018.01)
G06F 13/24 (2006.01)

(52) U.S. Cl.
CPC .......... *G06F 13/28* (2013.01); *G06F 13/4081* (2013.01); *H04L 9/0819* (2013.01); *G06F 2009/45587* (2013.01)

(58) Field of Classification Search
CPC . G06F 2009/45587; G06F 2009/45579; G06F 2009/4557; G06F 2009/45562; G06F 21/78; G06F 21/60; H04L 9/0819; H04L 9/0897
See application file for complete search history.

(56) References Cited

U.S. PATENT DOCUMENTS

| | | | |
|---|---|---|---|
| 8,972,746 | B2 | 3/2015 | Johnson et al. |
| 9,432,183 | B1* | 8/2016 | Axnix ................ H04L 9/0822 |
| 9,596,076 | B1 | 3/2017 | Axnix et al. |
| 2014/0019745 | A1 | 1/2014 | Dodgson et al. |
| 2015/0052282 | A1 | 2/2015 | Dong |
| 2015/0127866 | A1* | 5/2015 | Zeng ................ G06F 9/45558 710/264 |
| 2015/0186311 | A1 | 7/2015 | Yap et al. |
| 2016/0171248 | A1 | 6/2016 | Nesher et al. |
| 2016/0359622 | A1* | 12/2016 | Bunch ................ H04L 67/1097 |
| 2017/0054557 | A1 | 2/2017 | Rozas et al. |
| 2018/0088804 | A1* | 3/2018 | Mummidi ................ G06F 3/067 |
| 2018/0217941 | A1* | 8/2018 | Horovitz ............ G06F 12/1441 |
| 2019/0079789 | A1* | 3/2019 | Mahkonen .......... G06F 9/45558 |

OTHER PUBLICATIONS

Stuecheli, J. (2016). IBM Corporation. Power8/9 Deep Dive. Pertinent Page # 18 https://openpowerfoundation.org/wp-content/uploads/2016/11/Jeff-Stuecheli-POWER9-chip-technology.pdf (Year: 2016).*
Virtual I/O Server, Pertinent pp. 91-92 & 144-145 https://www.ibm.com/docs/en/POWER6/iphb1/iphb1.pdf (Year: 2007).*
OpenPOWER Foundation. https://openpowerfoundation.org/wp-content/uploads/2016/11/Jeff-Stuecheli-POWER9-chip-technology.pdf. (n.d.). Retrieved Nov. 3, 2021, from https://openpowerfoundation.org/wp-content/uploads/2016/11/Jeff-Stuecheli-POWER9-chip-technology.pdf. (Year: 2016).*
Virtual I/O Server, Pertinent pp. 91-92 & 144-145; URL: https://www.ibm.com/docs/en/POWER6/iphb1/iphb1.pdf (Year: 2007).*
Virtual I/O Server, Pertinent pp. 91-92 & 144-145; URL: https:/Avww.ibm.com/docs/en/POWER6/iphb1/iphb1.pdf (Year: 2007).*
Virtual I/O Server, Pertinent pp. 91-92 & 144-145; URL: https://www.ibm.com/docs/en/POWERG6G/iphb 1/iphb1.pdf (Year: 2016).*
Https://web.archive.org/web/20150811185319/https://en.wikipedia.org/wiki/Data_segment (Year: 2015).*
Virtual I/O Server, Pertinent pp. 91-92 & 144-145; URL: https:/Avww.ibm.com/docs/en/POWERG6G/iphb 1/iphb1.pdff. (n.d.). Retrieved Nov. 3, 2021, from https://openpowerfoundation.org/Awp-content/uploads/2016/11/ Jeff-Stuecheli-POWER9-chip-technology.pdf (Year: 2016).*
Https://web.archive.org/web/20150811185319/nttps://en.wikipedia.org/wiki/Data_segment (Year: 2015).*
OpenPOWER Foundation. https://openpowerfoundation.org/Awp-content/uploads/2016/11/Jeff-Stuecheli-POWER9-chip-technology.pdf. (n.d.). Retrieved Nov. 3, 2021, from https://openpowerfoundation.org/Awp-content/uploads/2016/11/Jeff-Stuecheli- POWER9-chip-technology.pdf (Year: 2016).*
Virtual I/O Server, Pertinent pp. 91-92 & 144-145; URL: httos:/Avww.iobm.com/docs/en/POWERG6G/iphb 1/iphb1 .pdf f. (n.d.). Retrieved Nov. 3, 2021, from https://ooenpowerfoundation.org/Awp-content/uploads/2016/11/ Jeff-Stuecheli- POWER9-thin-technology.pdf (Year: 2016).*
Orenbach, et al., "Eleos: Exit-Less OS Services for SGX Enclaves," Accelerated Computing Systems Lab, Haifa, Israel, 87 pages. May 5, 2017.
Dewan, et al., "A Hypervisor-Based System for Protecting Software Runtime Memory and Persistent Storage," Communications Technology Lab/Software Solutions Group, Intel Corporation, Hillsboro, Oregon, USA, pp. 8280835. 2008.
Kaplan, et al., "AMD Memory Encryption," White Paper, Advanced Micro Devices, Inc., 12 pages. Apr. 21, 2016.
"Data segment," Wikipedia, 4 pages. Aug. 28, 2017.
"Hypervisor security: New techniques for securing virtual machines," ComputerWeekly.com, 5 pages. 2017.
"OpenPOWER I/O Design Architecture: Version 2," Revisions 1.0.0, OpenPOWER Foundation Hardare Architecture Workgroup, 70 pages. Feb. 17, 2016.
"Remote direct memory access," Wikipedia, 2 pages. Nov. 30, 2017.
"Single-root input/output virtualization," Wikipedia, 1 page. Jul. 30, 2017.
Johnson, Simon, "The Intel SGX Memory Encryption Engine," White Paper, software.intel.com, 2 pages. Feb. 26, 2016.

* cited by examiner

MECHANISM TO ENABLE SECURE MEMORY SHARING BETWEEN ENCLAVES AND I/O ADAPTERS

BACKGROUND

The present disclosure relates to virtual machines. More particularly, the present disclosure relates to secure memory sharing between virtual machines and virtual input/output adapters.

Computer systems, such as hardware systems and software systems, that run on computers often have undetected flaws that can be exploited by hardware attacks or software attacks, such as malicious computer programs that are received over the Internet or other communication networks. The attacks can include Trojans, viruses, worms, spyware, and other malware. Many existing computer security systems combat the attacks by attempting to prevent the attacks from compromising any part of a computer system.

Traditional computer security systems provide relatively low assurance protection of the entire software system. Some systems can provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext which is unencrypted data) in memory. Replay protection eliminates any undetected temporal substitution of the ciphertext. In the absence of encryption, integrity, and replay protections, an attacker with physical access to the system can record snapshots of data lines and replay the data lines at a later point in time to modify the data lines and attack the computer system.

In light of possible attacks, encryption has been widely adopted. For example, input/output (I/O) adapters, which previously could read virtual machine (VM) memory (unencrypted) are no longer able to do so in an environment with enclaved VM, due to the use of memory encryption. Memory encryption is used to protect the memory of an enclave so that nothing can get in or out without the enclave's permission. Thus, unfettered Direct Memory Access (DMA) to an entire enclave is no longer possible for a given I/O adapter.

SUMMARY

Shortcomings of the prior art are overcome, and additional advantages are provided, through the provision, in one aspect, of a method. The method can include, for example: a computer-implemented process for secure memory sharing between enclaves and virtual input/output adapters, the computer-implemented process comprising, in response to a request for an enclave to create a virtual input/output adapter, creating a virtual input/output adapter associated with the enclave, creating a non-sharable micro-enclave, to contain only data, nested within the enclave to use with the virtual input/output adapter, generating a key by a memory encryption engine for the virtual input/output adapter for use by only the virtual input/output adapter, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

In another aspect, a computer program product can be provided. The computer program product can include a computer readable storage medium readable by one or more processing circuit and storing instructions for execution by one or more processor for performing a method. The method can include, for example, a computer program product for secure memory sharing between enclaves and virtual input/output adapters, the computer-implemented process comprising, in response to a request for an enclave to create a virtual input/output adapter, creating a virtual input/output adapter associated with the enclave, creating a non-sharable micro-enclave, to contain only data, nested within the enclave to use with the virtual input/output adapter, generating a key by a memory encryption engine for the virtual input/output adapter for use by only the virtual input/output adapter, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

In a further aspect, a system can be provided. The system can include, for example a memory. In addition, the system can include one or more processors in communication with the memory. Further, the system can include program instructions executable by the one or more processors via the memory to perform a method. The method can include, for example, a system for secure memory sharing between enclaves and virtual input/output adapters, the computer-implemented process comprising, in response to a request for an enclave to create a virtual input/output adapter, creating a virtual input/output adapter associated with the enclave, creating a non-sharable micro-enclave, to contain only data, nested within the enclave to use with the virtual input/output adapter, generating a key by a memory encryption engine for the virtual input/output adapter for use by only the virtual input/output adapter, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

As shown in FIG. 3, the hypervisor creates an enclave and a corresponding virtual I/O adapter is created. The enclave then creates a micro-enclave and it is attached to the virtual I/O adapter. Unique encryption keys for each micro-enclave/virtual I/O adapter pair are generated. In response to the key exchange, access is granted to the I/O adapter;

DETAILED DESCRIPTION

Figure 1:
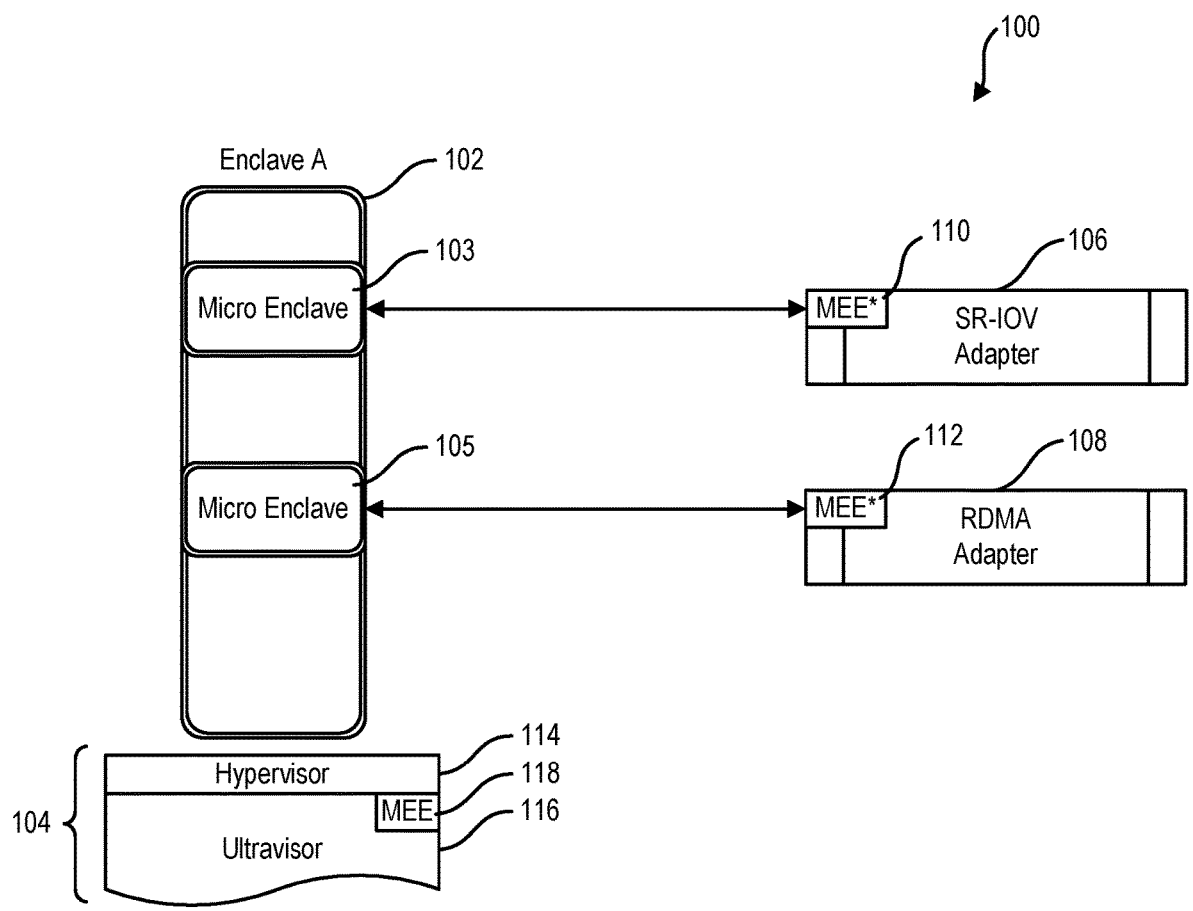
FIG. 1 is a block diagram of one example of an overall micro-enclave architecture utilizing encryption, in accordance with one or more aspects of the present disclosure. Shown in FIG. 1 is an enclave running on top of a hypervisor/ultravisor technology. The micro-enclave architecture includes two micro-enclaves and two corresponding virtual I/O adapters plugged into the enclave. The ultravisor controls, through a memory encryption engine, the generation of encryption keys for the micro-enclave/virtual I/O adapter pairs.

Conventionally, enclaves are isolated regions of code and data within the address space for an application. Only code that runs within the enclaves can access data within the same enclave, however, all the data in the enclave is accessible. This disclosure proposes one example of enabling devices that share memory with a Virtual Machine to be able to securely access it through, for example, Direct Memory Access (DMA), Remote DMA (RDMA) and/or single-root input/output virtualization (SR-IOV). This is accomplished by limiting access to only a portion of the enclave, the enclave portion associated with a unique cryptographic key.

DMA is a method that allows an input/output (I/O) device to send or receive data directly to or from the main memory, bypassing the CPU to speed up memory operations. The process is managed by a chip known as a DMA controller (DMAC).

In computing, remote direct memory access (RDMA) is a direct memory access from the memory of one computer into that of another without involving either computer's operating system. This permits high-throughput, low-latency networking, which is especially useful in massively parallel computer clusters.

RDMA supports zero-copy networking by enabling the network adapter to transfer data directly to or from application memory, eliminating the need to copy data between application memory and the data buffers in the operating system. Such transfers require no work to be done by CPUs, caches, or context switches, and transfers continue in parallel with other system operations. When an application performs an RDMA Read or Write request, the application data is delivered directly to the network, reducing latency and enabling fast message transfer.

In virtualization, single-root input/output virtualization or SR-IOV is a specification that allows the isolation of PCI Express resources for manageability and performance reasons. A single physical PCI Express can be shared in a virtual environment using the SR-IOV specification. The SR-IOV offers different virtual functions to different virtual components (e.g. network adapter) on a physical server machine. The SR-IOV allows different virtual machines (VMs) in a virtual environment to share a single PCI Express hardware interface.

Memory attacks come in many different forms. For example, a DoS or distributed denial-of-service (DDoS) attack is an attempt to make a machine or network resource unavailable to its intended users. Although the means to carry out a DoS attack vary, such an attack generally consists of efforts to temporarily or indefinitely interrupt or suspend services of a host connected to the Internet. A DoS attack may involve saturating the target machine with external communications requests, so much so that the target machine cannot respond to legitimate traffic or responds so slowly as to be rendered essentially unavailable. Such attacks usually lead to a server overload. In general terms, DoS attacks are implemented by either forcing the targeted computer(s) to reset, or consuming its resources so that it can no longer provide its intended service or obstructing the communication media between the intended users and the victim so that they can no longer communicate adequately. A DoS attack may also include denial to a service inside the device. For example, such DoS attacks may include denying the proper operation of a trusted agent or trusted manager; and/or denying the operation of a communication channel between the trusted agent and the trusted manager and/or between the trusted manager and the backend service.

Attacks by malicious software, also called malware, refers to programming (code, scripts, active content, and other software) designed to disrupt or deny operation, gather information to violate privacy or exploitation, gain unauthorized access to system resources, and enable other abusive behavior. The expression is a general term used by computer professionals to mean a variety of forms of hostile, intrusive, or annoying software or program code.

Malware includes various software including computer viruses, worms, Trojan horses, spyware, dishonest adware, scareware, crimeware, rootkits, and other malicious and unwanted software or program, and is considered to be malware based on the perceived intent of the creator rather than any particular features.

Cryptographic protection of memory is an essential ingredient for any technology that allows a closed computing system to run software in a trustworthy manner and handle secrets, while its external memory is susceptible to eavesdropping and tampering. An example for such a technology is Software Guard Extensions technology (SGX) from Intel Corporation that appears in recent processor generations. This technology operates under the assumption that the security perimeter includes only the internals of the CPU package, and in particular, leaves the DRAM untrusted. It is supported by an autonomous hardware unit called the Memory Encryption Engine (MEE), whose role is to protect the confidentiality, integrity, and freshness of the CPU-DRAM traffic over some memory range.

A modern processor has an internal cache that accommodates a small amount of memory, and can be accessed much faster than the system memory. During normal operation, memory transactions are continuously issued by the processor's Core, and transactions that miss the cache are handled by the Memory Controller (MC). The MEE operates as an extension of the MC, taking over the cache-DRAM traffic that points to what is called the "Protected" data region. An additional portion of the memory, called the "seized" region, accommodates the MEE's integrity tree. The union of these regions is called the "MEE region". It forms a range of physical addresses that is fixed to some size at boot time (the default size is 128 MB), in a trustworthy way.

Read/write requests to the protected region are routed by the MC to the MEE that encrypts (decrypts) the data before sending (fetching) it to (from) the DRAM. The MEE initiates autonomously additional transactions to verify (update) the integrity tree, based on a construction of counters and MAC tags. The self-initiated transactions access the seized region on the DRAM, and also some ondie SRAM array that serves as the root of the tree.

Cryptography is the practice and study of techniques for secure communication in the presence of third parties called adversaries. More generally, cryptography is about constructing and analyzing protocols that prevent third parties or the public from reading private messages; various aspects in information security such as data confidentiality, data integrity, authentication, and non-repudiation are central to modern cryptography. Applications of cryptography include electronic commerce, chip-based payment cards, digital currencies, computer passwords, and military communications.

The key exchange between the virtual I/O adapters and the micro-enclaves is an in-band exchange; that is, the key exchange is made through the same communication channel to be encrypted. The key exchange uses a symmetric key cipher, so both participants in the key exchange will need a copy of the same key.

In symmetric systems the same key (the secret key) is used to encrypt and decrypt a message. A cipher (or cypher) is a pair of algorithms that create the encryption and the reversing decryption. The detailed operation of a cipher is controlled both by the algorithm and in each instance by a "key." The key is a secret (ideally known only to the communicants), usually a short string of characters, which is needed to decrypt the ciphertext. Symmetric key ciphers are implemented as either block ciphers or stream ciphers. A block cipher enciphers input in blocks of plaintext as opposed to individual characters, the input form used by a stream cipher. Stream ciphers, in contrast to the 'lock' type, create an arbitrarily long stream of key material, which is combined with the plaintext bit-by-bit or character-by-character.

As noted above, in newer generations of processors from INTEL® Corporation, Software Guard Extensions ("SGX") allow for the creation of (previously thought) secure enclaves. However, researchers at Ohio State University have demonstrated a method to adapt "Spectre" to read data protected by Software Guard Extensions (SGX), which allows for the creation of a secure enclave in memory to protect data from being used by applications at a higher privilege level. While the original Spectre vulnerability relied on branch prediction and speculation to read kernel-level memory, it was not able to read the contents of SGX-protected secure enclaves.

This vulnerability—called SgxPectre—combines the branch prediction and speculation attributes of Spectre with vulnerable code patterns in the existing SGX runtime libraries (Intel SGX SDK, Rust-SGX, and Graphene-SGX were named specifically by the researchers) to gain complete access to the contents of the secure enclave. Because the problems exist in the runtime libraries, any program utilizing SGX is insecure, independent of how SGX utilization is implemented in the program.

The micro-enclave structure of the present disclosure helps protect the enclave against and minimize the effects of attacks, such as those described above, by limiting enclave access to micro-enclaves, rather than full enclave access, in conjunction with individual encryption keys for each pair of virtual I/O adapter and micro-enclave.

In computing, virtual memory (also virtual storage) is a memory management technique that provides an "idealized abstraction of the storage resources that are actually available on a given machine," which "creates the illusion to users of a very large (main) memory."

The computer's operating system, using a combination of hardware and software, maps memory addresses used by a program, called virtual addresses, into physical addresses in computer memory. Main storage, as seen by a process or task, appears as a contiguous address space or collection of contiguous segments. The operating system manages virtual address spaces and the assignment of real memory to virtual memory. Address translation hardware in the CPU, often referred to as a memory management unit or MMU, automatically translates virtual addresses to physical addresses. Software within the operating system may extend these capabilities to provide a virtual address space that can exceed the capacity of real memory and thus reference more memory than is physically present in the computer.

The primary benefits of virtual memory include freeing applications from having to manage a shared memory space, increased security due to memory isolation, improved desktop management and security, and being able to conceptually use more memory than might be physically available, using the technique of paging. Virtualization can dramatically reduce or eliminate the number of physical servers and dynamically redistribute excess computing power to where it is needed most. Reducing the number of physical servers also reduces ongoing energy requirements, making it a more environmentally friendly way of doing business.

Virtualization increases availability of hardware and applications, improving business continuity and disaster recovery. It enables secure backups and migration of entire virtual environments with practically no interruption in day-to-day operations. Virtualization provides an easier route for IT staff to install and maintain software, distribute updates and maintain a more secure network. They can do this with less downtime, fewer outages, quicker recovery and instant backup as compared to a non-virtual environment PCI Express (Peripheral Component Interconnect Express), known as "PCIe," is a high-speed serial computer expansion bus standard, designed to replace older bus standards. PCIe has numerous improvements over the older standards, including higher maximum system bus throughput, lower I/O pin count and smaller physical footprint, better performance scaling for bus devices, a more detailed error detection and reporting mechanism, and native hot-swap functionality. More recent revisions of the PCIe standard provide hardware support for I/O virtualization.

A physical I/O adapter is an electronic circuit, expansion card or plug-in module that accepts input and generates output in a particular format. The "adapter" part of the term means that a conversion of the data format and electronic timing takes place between the input/output streams and the internal computer circuits. Input/output (I/O) virtualization is a methodology to simplify management, lower costs and improve performance of servers in, for example, enterprise environments. I/O virtualization environments are created by abstracting the upper layer protocols from the physical connections.

The technology enables, for example, one physical adapter card to appear as multiple virtual network interface cards (vNICs) and virtual host bus adapters (vHBAs). Virtual NICs and HBAs function as conventional NICs and HBAs, and are designed to be compatible with existing operating systems, hypervisors, and applications. To networking resources (LANs and SANs), they appear as normal cards.

In the physical view, virtual I/O replaces a server's multiple I/O cables with a single cable that provides a shared transport for all network and storage connections. That cable (or commonly two cables for redundancy) connects to an external device, which then provides connections to, for example, a data center network.

Virtual I/O addresses performance bottlenecks by consolidating I/O to a single connection whose bandwidth ideally exceeds the I/O capacity of the server itself, thereby ensuring that the I/O link itself is not a bottleneck. That bandwidth is then dynamically allocated in real time across multiple virtual connections to both storage and network resources. In I/O intensive applications, this approach can help increase both VM performance and the potential number of VMs per server.

A hypervisor or virtual machine monitor (VMM) is computer software, firmware and/or hardware that creates and runs virtual machines. A computer on which a hypervisor manages/runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine.

An ultravisor partition maintains the master database of hardware resource allocations and serves as a command channel to accept transactional requests for assignment of resources to partitions while also providing individual read-only views of the individual partitions to the associated partition monitors. The ultravisor also filters all calls between the secure virtual machine (SVM) and the hypervisor to assure that only the information required to perform the call is passed to the hypervisor. It also makes sure that only the response from the hypervisor goes back to the SVM. Where an ultravisor is present, the hypervisor is essentially reduced to a context switching and containment element. The hardware prevents unauthorized system software (and hardware), for example, the hypervisor and normal virtual machines, from referencing secure memory. However, the hypervisor retains all its traditional functions not transferred to the ultravisor.

Figure 9:
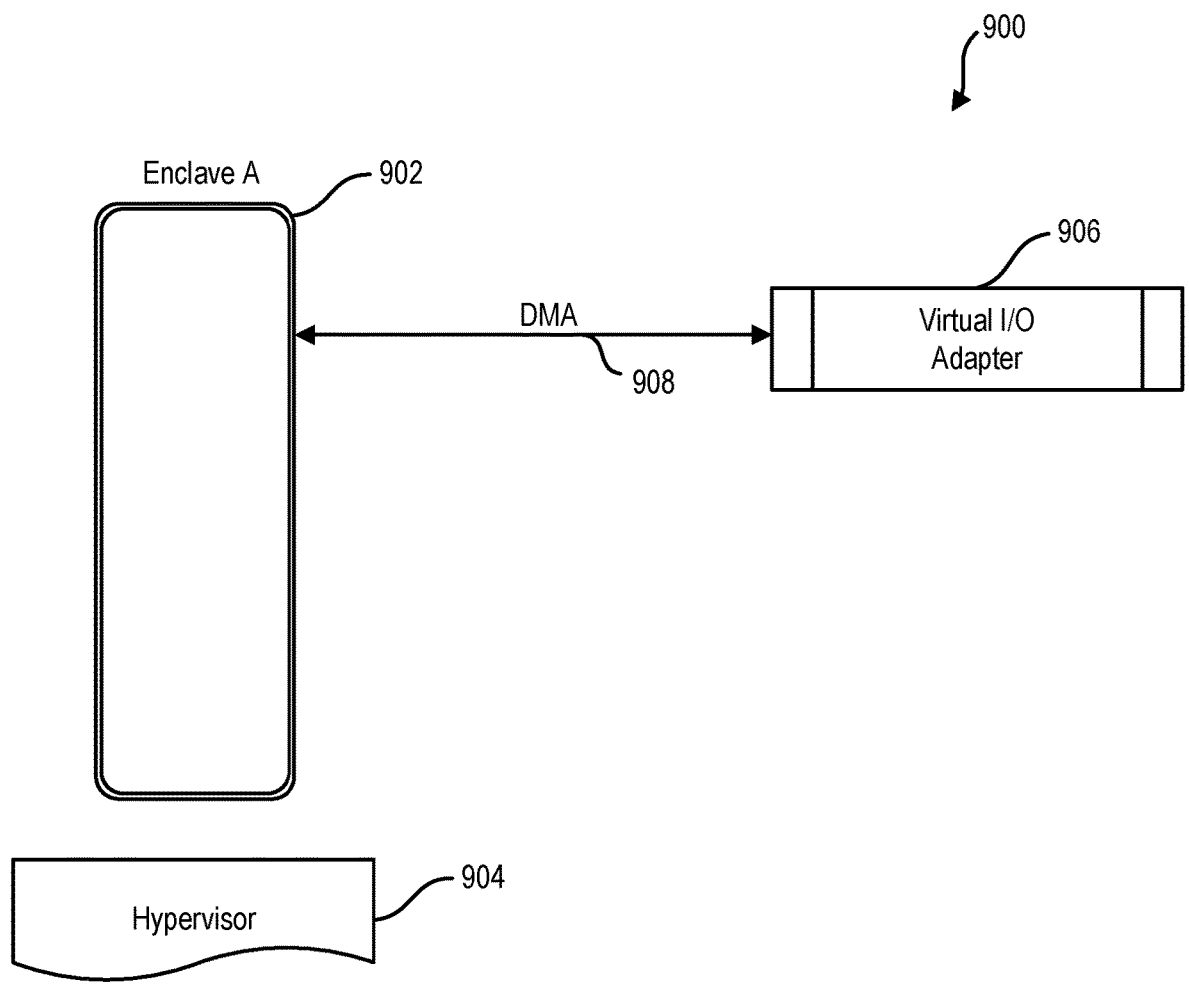
FIG. 9 is a block diagram of one example of an overall enclave architecture that does not employ encryption.

FIG. 9 is a block diagram of one example of an overall enclave architecture 900 that does not use encryption for the enclave. Shown in FIG. 9 is an enclave (Virtual Machine A) 902. The VM is running on top of a hypervisor (or virtual machine monitor) 904. A virtual I/O adapter 906 is connected to the enclave. As the enclave is not encrypted, the virtual I/O adapter, when access is provided, can access an entirety of the enclave, for example, using direct memory access 908 or other known forms of access. Without encryption, that the virtual I/O adapter can access all of the enclave is true even where the data the virtual I/O adapter needs access to, is only in a portion of the enclave, for example, a certain address range. It is easy to imagine the ramifications of such unfettered access. It may not even be an attack that renders the data in the enclave unusable; something as simple as a corrupt virtual I/O adapter can be the culprit.

Some embodiments of the present invention may include one, or more, of the following operations, features, characteristics and/or advantages: (i) a computer-implemented process for secure memory sharing between enclaves and input/output adapters, the computer-implemented process; (ii) in response to a request for an enclave to create a virtual input/output adapter, creating a virtual input/output adapter associated with the enclave; (iii) creating a non-sharable micro-enclave, to contain only data, nested within the enclave to use with the virtual input/output adapter; (iv) generating a key by a memory encryption engine of the virtual input/output adapter for use by only the virtual input/output adapter; (v) in response to a request to obtain data from the enclave by the virtual input/output adapter, exchanging the key with the non-sharable micro-enclave; (vi) in response to receiving the key, decrypting memory of only the non-sharable micro-enclave associated with the key to obtain the data; (vii) sending the data from the non-sharable micro-enclave associated with the enclave; (viii) route interrupt from inside the enclaved VM (as, for example, using the new virtualization interruption scheme on Power 9, called XIVE); and/or (ix) using XIVE and enclave to speed up the interrupt handling for this type of workload (that is, interrupt goes straight to the enclave instead of routing thorough the host or hypervisor).

Certain embodiments herein may offer various technical computing advantages involving computer advantages to address problems arising in the realm of computer networks and computer systems. Embodiments herein can improve the security of memory sharing between enclaves and virtual I/O adapters, while maintaining performance of a computer system. Embodiments herein utilize data-only micro-enclaves nested within enclaves and employs encryption to restrict access to enclave memory by virtual I/O adapters to only a necessary portion of the enclave memory, the data-only micro-enclave. Since a given virtual I/O adapter is limited in access, the access is faster than access to the entire enclave memory. Each virtual I/O adapter gets a unique key usable with only a micro-enclave paired with the virtual I/O adapter. Embodiments herein can concurrently process multiple micro-enclave/virtual I/O adapter pairs. Embodiments herein allow an interrupt to be directly routed to an enclave, bypassing the CPU, which enables faster handling of the interrupt and improved performance.

FIG. 1 is a block diagram of one example of an overall micro-enclave architecture 100 utilizing encryption, in accordance with one or more aspects of the present disclosure. Shown in FIG. 1 depicts, for example, an enclave (Virtual Machine A) 102. The VM is running on top of a hypervisor (or virtual machine monitor)/ultravisor technology 104. Enclave A is created in response to, for example, a user request or an automated script (e.g., for cloud computing). The micro-enclave architecture includes two micro-enclaves 103 and 105, each having a corresponding virtual input/output adapter plugged into the enclave.

In the example of FIG. 1, one virtual I/O adapter is an SR-IOV adapter 106 and the other virtual I/O adapter is an RDMA adapter 108. Remote direct memory access (RDMA) is a direct memory access from the memory of one computer into that of another without involving either computer's operating system. This permits high-throughput, low-latency networking, which is especially useful in massively parallel computer clusters. RDMA supports zero-copy networking by enabling the network adapter to transfer data directly to or from application memory, eliminating the need to copy data between application memory and the data buffers in the operating system. SR-IOV is a specification allowing isolation of resources for manageability, performance reasons and allows different virtual machines to share a single hardware interface.

Although two virtual I/O adapters are shown in FIG. 1, it will be understood that, one, or more than two, virtual I/O adapters may be present and/or different I/O adapter types may be used (e.g., a DMA adapter). A portion of the memory of each virtual I/O adapter is provided and encrypted by the Memory Encryption Engine (MEE) 118, represented in FIG. 1 as "MEE*" 110 and 112. The ultravisor controls, through MEE 118, which is a hardware-based capability, the generation of encryption keys for the assigned micro-enclaves, i.e., virtual I/O adapters 106 and 108 and micro-enclaves 103 and 105, respectively. In order to facilitate the secure accessing of a data portion in an enclave, the creation of inner enclaves, a.k.a., micro-enclaves, is disclosed herein.

More accurately, the MEE is a hardware capability of the relevant processor(s) and the ultravisor manages usage of the MEE. Thus, the MEE is shown "residing," abstractly or logically, in the ultravisor. The representative MEE* 110 and 112 are shown within the adapters to represent that the corresponding memory areas within the adapters are provided and encrypted by the MEE of the ultravisor.

This technology operates under the assumption that the security perimeter includes only the internals of the CPU package, and in particular, leaves the memory untrusted. It is supported by an autonomous hardware unit called the Memory Encryption Engine (MEE), whose role is to protect the confidentiality, integrity, and freshness of the CPU-DRAM traffic over some memory range.

In the present disclosure, this capability is extended to sub-portions of a memory enclave, i.e., micro-enclaves or inner enclaves. The capability, controlled in this example by the ultravisor, includes a set of CPU instructions, supported by a hardware-based access control mechanism. Conventionally, they provide a way to load application code and data from memory, while incrementally locking it in a dedicated region, and encrypting it. Of course, in the example of FIG. 1, only data is loaded into the enclave; there is no application code. After the data is loaded, it can run in a special mode known as a secure "enclave," remaining isolated from all other data/processes in the system (isolation is governed by the access control mechanism).

A micro-enclave or inner enclave is a non-zero portion of the enclave memory that is less than an entirety of the enclave memory. The micro-enclaves are nested within the enclave and each has a unique encryption key. As used herein, the micro-enclaves are for data only, so, the content is non-executable (herein, "NX"). "Data" in this context refers to data segments. In computing, a data segment (often denoted .data) may be, for example, a portion of an object file or the corresponding virtual address space of a program that contains initialized static variables; that is, global variables and static local variables. The size of this segment is determined by the size of the values in the program's source code, and does not change at run time. managing technology 104 includes a hypervisor 114 and an ultravisor 116, the ultravisor including MEE 118 therein.

The micro-enclaves are created to protect the enclave/VM from the virtual I/O adapters, as well as the hypervisor. Each micro-enclave is created for each virtual I/O adapter, and is not shared with other virtual I/O adapters. Thus, for example, if the virtual I/O adapter is corrupted, it will only have access to the micro-enclave reserved to it; there will be no access to any other data in the enclave.

Aspects of the present disclosure include, for example, a MEE (memory encryption engine) in I/O adapters, support in enclaved VMs for I/O adapters that access memory, micro-enclaves for multiple I/O adapters to access memory within the same enclave, and NX (No-eXecute) enclaves, which are a special enclave type, the purpose of which is to share memory between the enclave and the I/O adapter.

Figure 2:
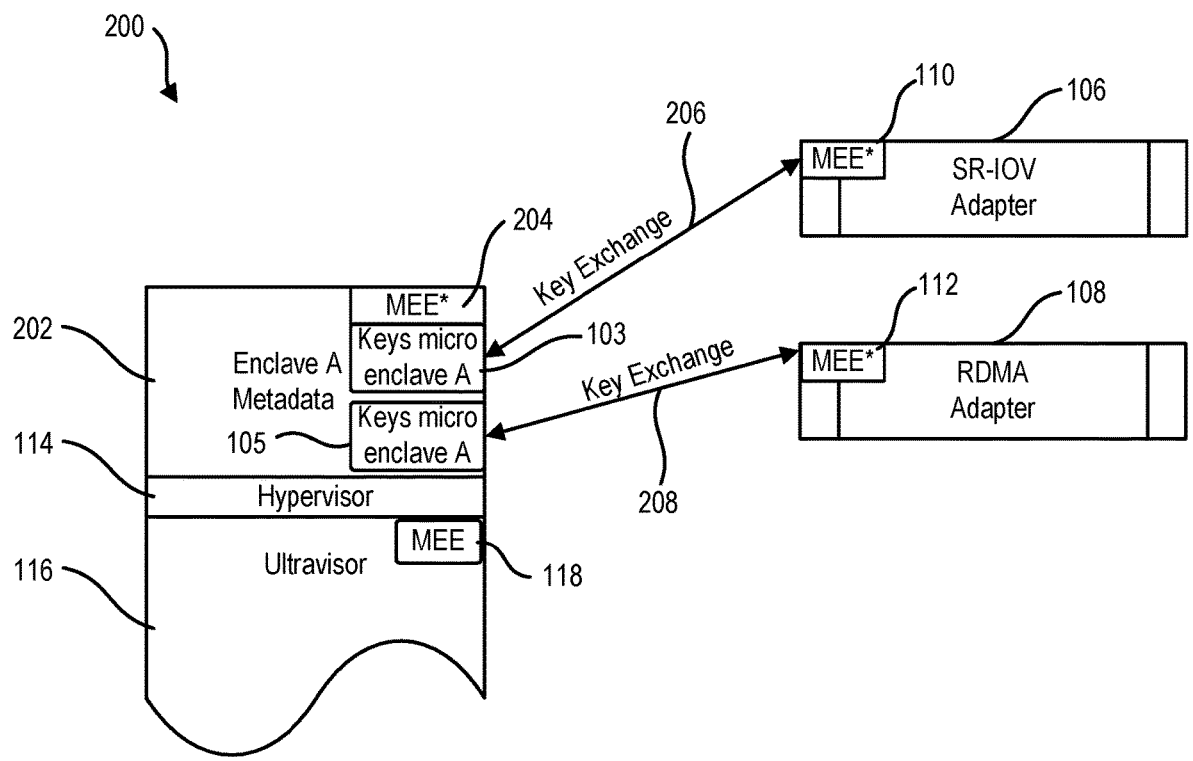
FIG. 2 is a block diagram of one example of a key exchange between micro-enclaves and their corresponding I/O adapters, in accordance with one or more aspects of the present disclosure. The enclave includes a metadata portion, which is used to load the enclave and defines various trusted data and includes a signature for the enclave. After the key exchange, decryption and access to the data is given to the I/O adapters for only the paired micro-enclave.

FIG. 2 is a block diagram 200 of one example of a key exchange between the micro-enclaves and their corresponding virtual I/O adapters shown in FIG. 1, in accordance with one or more aspects of the present disclosure. As shown in FIG. 2, in one example, enclave 102 (see FIG. 1) includes metadata portion 202. The metadata portion includes an area 204 (labeled "MEE*") representing that the area is a memory area provided/encrypted by the MEE shown within (i.e., controlled by) the ultravisor 116. Key exchanges 206 and 208 take place between virtual I/O adapters 106 and 108, through which the ultravisor-generated keys are provided, and micro-enclaves 103 and 105, respectively. After a successful key exchange, the respective micro-enclave memory is decrypted and each I/O adapter will only be able to access the memory of its paired micro-enclave.

Note that the metadata of FIG. 2 is not immediately loaded into the protected memory space, but is used to determine how to properly load the enclave in protected memory space. The metadata defines various trusted data and includes a signature for the enclave, which serves as a certificate of authenticity and origin of an enclave.

Figure 3:
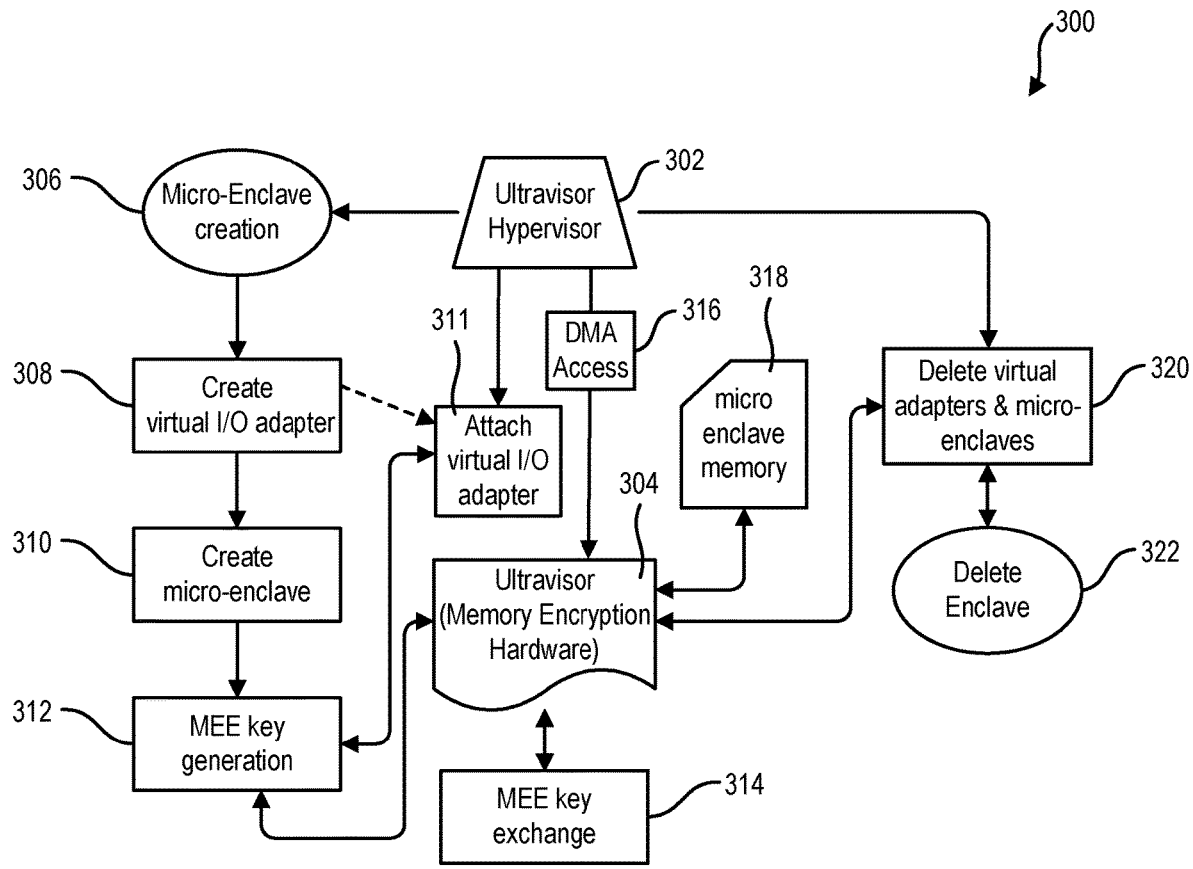
FIG. 3 is a combined flow diagram and block diagram for one example of secure enclave memory access, in accordance with one or more aspects of the present disclosure.

FIG. 3 is a combined flow diagram and block diagram 300 for one example of secure enclave memory access, in accordance with one or more aspects of the present disclosure. As shown in FIG. 3, the hypervisor 302 and ultravisor 304 are at the heart of the process. Note that an ultravisor need not be present, there could just be a hypervisor, in which case, the functions of the ultravisor described herein would be performed by the host or hypervisor. A hypervisor or virtual machine monitor (VMM) is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine.

Where present, the ultravisor partition maintains a master database of the hardware resource allocations. The ultravisor also serves as a command channel to accept transactional requests for assignment of resources to partitions while also providing individual read-only views of the individual partitions to the associated partition monitors. The ultravisor also filters all calls between the secure virtual machine (SVM) and the hypervisor to assure that only the information required to perform the call is passed to the hypervisor. It also makes sure that only the response from the hypervisor goes back to the SVM. The hardware prevents unauthorized system software (and hardware), for example, the hypervisor and virtual machines, from referencing secure memory. However, the hypervisor retains all its traditional functions.

The micro-enclave process starts whenever an I/O adapter is attached to an enclave during its creation or dynamically attached via hotplug operation. Returning to FIG. 3, as noted above, the hypervisor creates 306 an enclave in response to a request from, for example, a user or automated script, and a virtual I/O adapter is created 308 in response to a request from, for example, the user or script. The enclave then creates 310 a micro-enclave and the hypervisor attaches 311 it to the virtual I/O adapter.

Encryption key generation 312 is a hardware-based processor capability that is handled by the ultravisor in conjunction with the Memory Encryption Engine (MEE) for the pairs of virtual I/O adapters and micro-enclaves. See FIG. 2. In response to a successful key exchange 314, the hypervisor grants DMA access 316 to the I/O adapter, via the ultravisor, to access 318 the micro-enclave memory. At an appropriate time, for example, in response to a request for resource deletion by, for example, the user or automated script, the hypervisor deletes 322 the enclave after the ultravisor deletes 320 the virtual adapters and micro-enclaves.

Figure 4:
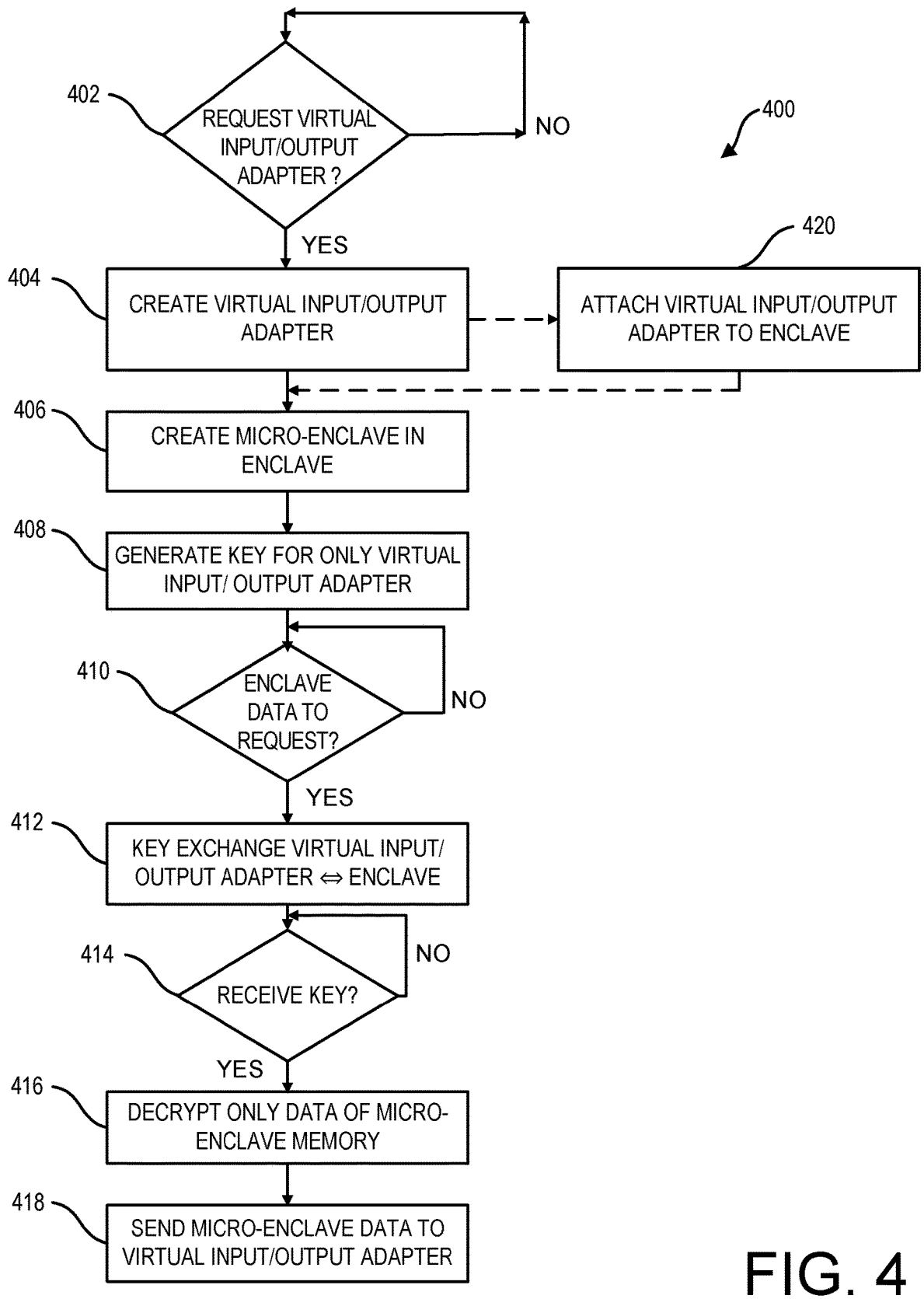
FIG. 4 is a flow diagram for one example of a computer-implemented process for secure memory sharing between enclaves and virtual input/output adapters, in accordance with one or more aspects of the present disclosure. A virtual input/output adapter and a micro-enclave are created, the micro-enclave nested within the enclave. The MEE of the ultravisor generates a unique cryptographic key for each virtual input/output adapter. After the key exchange, the memory of the micro-enclave is decrypted and the decrypted data is sent out.

FIG. 4 is a flow diagram 400 for one example of a computer-implemented process for secure memory sharing between enclaves and virtual input/output adapters, in accordance with one or more aspects of the present disclosure. In FIG. 4, in response to a request for a virtual input/output adapter being made at decision block 402, a virtual input/output adapter is created 404, and a micro-enclave is created 406, the micro-enclave being nested within the relevant enclave (e.g., enclave 102 of FIG. 1 herein). In one example, the enclave is created in response to, for example, a user request or automated script (e.g., for cloud computing).

The MEE of the hypervisor/ultravisor (e.g., MEE 118 is in ultravisor 116 in the example of FIG. 1) generates a cryptographic key for only the virtual input/output adapter, 408. Once a request for enclave data is received at decision block 410, a key exchange takes place between the virtual input/output adapter and the enclave, 412 (see also FIG. 2). When the key exchange is successful at decision block 414, the memory of the micro-enclave is decrypted 416 and the decrypted data is sent to the virtual input/output adapter, 418. In one example, the virtual input/output adapter may be attached to the enclave at creation.

In another example, the virtual I/O adapter may be attached to the enclave dynamically as a "hot plug" operation 420. Hot plug is the addition of a component to a running computer system without significant interruption to the operation of the system. Hot plugging a device does not require a restart of the system. Common examples of hot-pluggable devices include a hard disk drive (HDD) or a solid-state drive (SSD) that can be added to a storage system and a USB drive, mouse, keyboard or printer that can be added to a personal computer (PC). Hot plugging is not the same as hot swapping a component into a running computer system. Hot swapping involves the replacement of a component, whereas hot plugging is the addition of a component that serves to expand the system.

Figure 5:
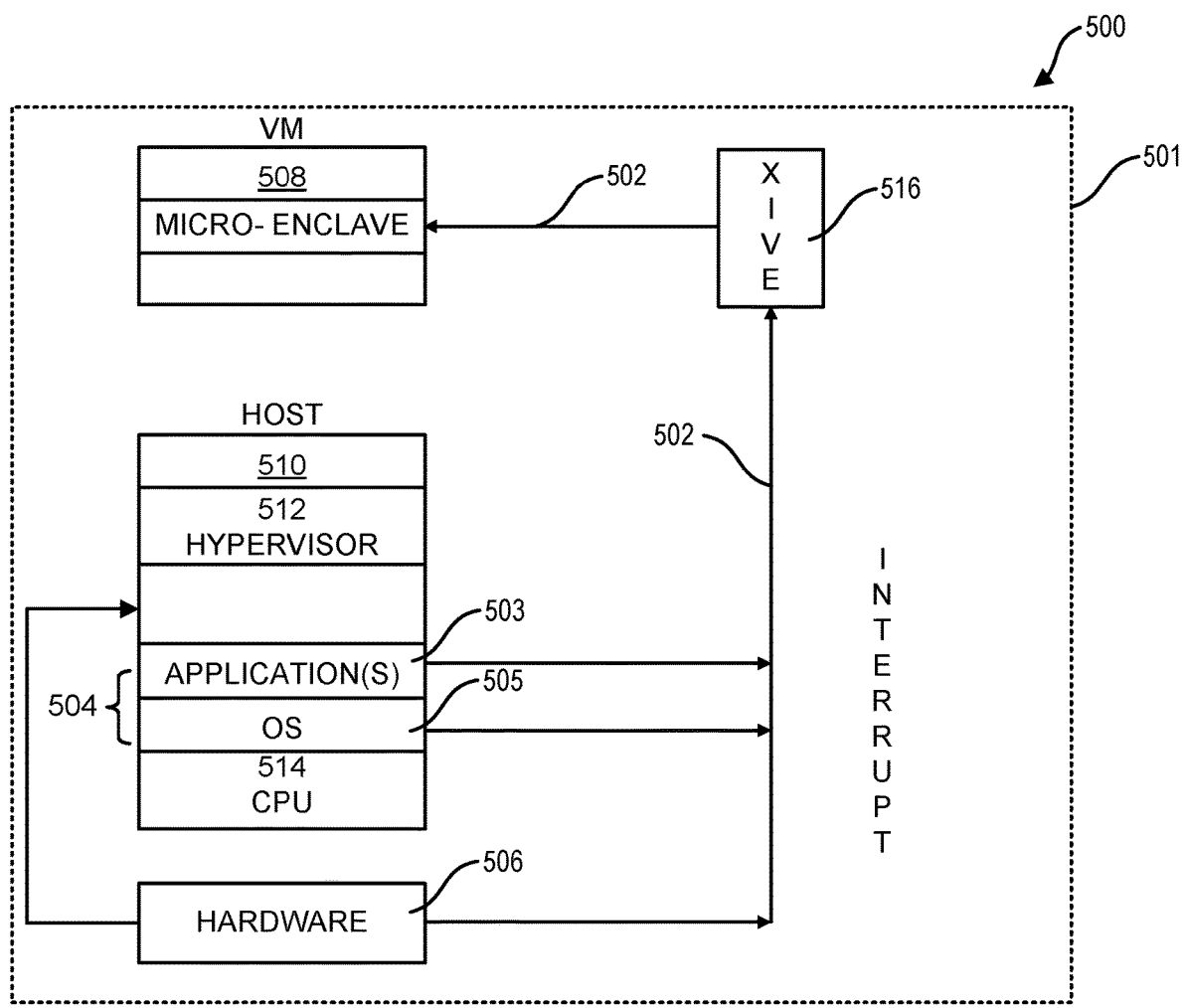
FIG. 5 is a simplified block diagram showing one example of a virtualization interrupt scheme, in accordance with one or more aspects of the present disclosure. In a micro-enclave environment, which includes a VM, a host, hardware and "XIVE," an interrupt is routed directly to the VM (enclave)

FIG. 5 is a simplified block diagram 500 of a virtualization interrupt scheme that may be used with the enclave/micro-enclave environment of the present disclosure. Shown in FIG. 5 is one example of a micro-enclave environment 501. The micro-enclave environment includes a virtual machine or enclave 508, a host computer 510, hardware 506 and "XIVE" 516 (explained more fully below). The virtualization interrupt scheme routes an interrupt 502, for example, a Level Signal Interrupt, which may be from software 504 (i.e., one or more applications 503 and operating system (OS) 505). The interrupt may instead come from hardware 506. In either case, the interrupt is routed directly to an enclave 508 (a.k.a., "Virtual Machine" or "VM") via XIVE 516, which avoids routing the interrupt through the host computer 510 or hypervisor 512.

In one example, the CPU 514 of FIG. 5 may be a POWER9 processor offered by International Business Machines Corporation (IBM®), Armonk, N.Y., which is specifically made for Artificial Intelligence applications and includes a state-of-the-art I/O subsystem technology. The POWER9 processor has a new systems architecture that is optimized for accelerators used in machine learning and includes a new virtualization interruption scheme known as "XIVE" 516, which stands for "External Interrupt Virtualization Engine." An XIVE provides the interrupt and, for example, the interrupt priority for routing (collectively, 518), e.g., a Level-Signaled Interrupt (LSI) to enclave 508. In one example, a lowest priority for an interrupt may be the default priority, which means that the interrupt is disabled and should not be present at the current time. In another example, an interrupt may have a highest priority or a priority between the lowest and highest priority.

In a first aspect, disclosed above is a computer-implemented process for secure memory sharing between enclaves and virtual input/output adapters, the computer-implemented process including, in response to a request for an enclave to create a virtual input/output adapter, creating a virtual input/output adapter associated with the enclave, creating a non-sharable micro-enclave, to contain only data, nested within the enclave to use with the virtual input/output adapter, generating a key by a memory encryption engine for the virtual input/output adapter for use by only the virtual input/output adapter, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

In one example, the computer-implemented process of the first aspect may be performed concurrently for multiple non-sharable micro-enclaves and a corresponding number of virtual input/output adapters.

In one example, the computer-implemented process of the first aspect, may include, for example, routing an interrupt directly to the enclave.

In one example, sending the data in the computer-implemented process of the first aspect may include, for example, using direct memory access.

In one example, sending the data in the computer-implemented process of the first aspect may include, for example, using remote direct memory access.

In one example, sending the data in the computer-implemented process of the first aspect may include, for example, using single-root input/output virtualization.

In one example, the computer-implemented process of the first aspect may further include, for example, attaching the virtual input/output adapter to the enclave at a time when creating the virtual input/output adapter.

In one example, the computer-implemented process of the first aspect may further include, for example, attaching the virtual input/output adapter to the enclave dynamically using a hotplug operation.

In a second aspect, disclosed above is a computer program product. The computer program product includes a non-transitory storage medium readable by a processor and storing instructions for performing a method of secure memory sharing between enclaves and virtual input/output adapters. The method includes, in response to a request for an enclave to create a virtual input/output adapter, creating a virtual input/output adapter associated with the enclave, creating a non-sharable micro-enclave, to contain only data, nested within the enclave to use with the virtual input/output adapter, and generating a key by a memory encryption engine for the virtual input/output adapter for use by only the virtual input/output adapter. The method further includes, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

In one example, the method stored on the computer program product of the second aspect may have multiple concurrent such processes occurring. In that regard, there would be multiple I/O adapter and micro-enclave pairs, each pair going through the process to allow each I/O adapter access to the memory of the micro-enclave associated therewith.

In one example, the method of the second aspect may include, for example, routing an interrupt directly to the enclave.

In one example, sending the data in the computer program product of the second aspect may include, for example, using direct memory access, remote direct memory access and/or single-root input/output virtualization.

In one example, the computer program product of the second aspect may further include, for example, attaching the virtual input/output adapter to the enclave at a time when creating the virtual input/output adapter.

In one example, the computer program product of the second aspect may further include, for example, attaching the virtual input/output adapter to the enclave dynamically using a hotplug operation.

In a third aspect, disclosed above is a system. The system includes a memory, and processor(s) in communication with the memory to perform a method. The method includes, in response to a request for an enclave to create a virtual input/output adapter, creating a virtual input/output adapter associated with the enclave, creating a non-sharable micro-enclave, to contain only data, nested within the enclave to use with the virtual input/output adapter, and generating a key by a memory encryption engine for the virtual input/output adapter for use by only the virtual input/output adapter. The method further includes, in response to a request to obtain data from the enclave by the virtual input/output adapter, exchanging the key with the non-sharable micro-enclave, in response to receiving the key, decrypting memory of only the non-sharable micro-enclave associated with the virtual input/output adapter to obtain the data, and sending the data from the non-sharable micro-enclave nested within the enclave to the virtual input/output adapter.

In one example, the method being processed in the system of the third aspect may have multiple concurrent such processes occurring. In that regard, there would be multiple I/O adapter and micro-enclave pairs, each pair going through the process to allow each I/O adapter access to the memory of the micro-enclave associated therewith.

In one example, the method of the system of the third aspect may include, for example, routing an interrupt directly to the enclave.

In one example, sending the data in the system of the third aspect may include, for example, using direct memory access, remote direct memory access and/or single-root input/output virtualization.

In one example, the system of the third aspect may further include, for example, attaching the virtual input/output adapter to the enclave at a time when creating the virtual input/output adapter.

In one example, the system of the third aspect may further include, for example, attaching the virtual input/output adapter to the enclave dynamically using a hotplug operation.

Figure 6:
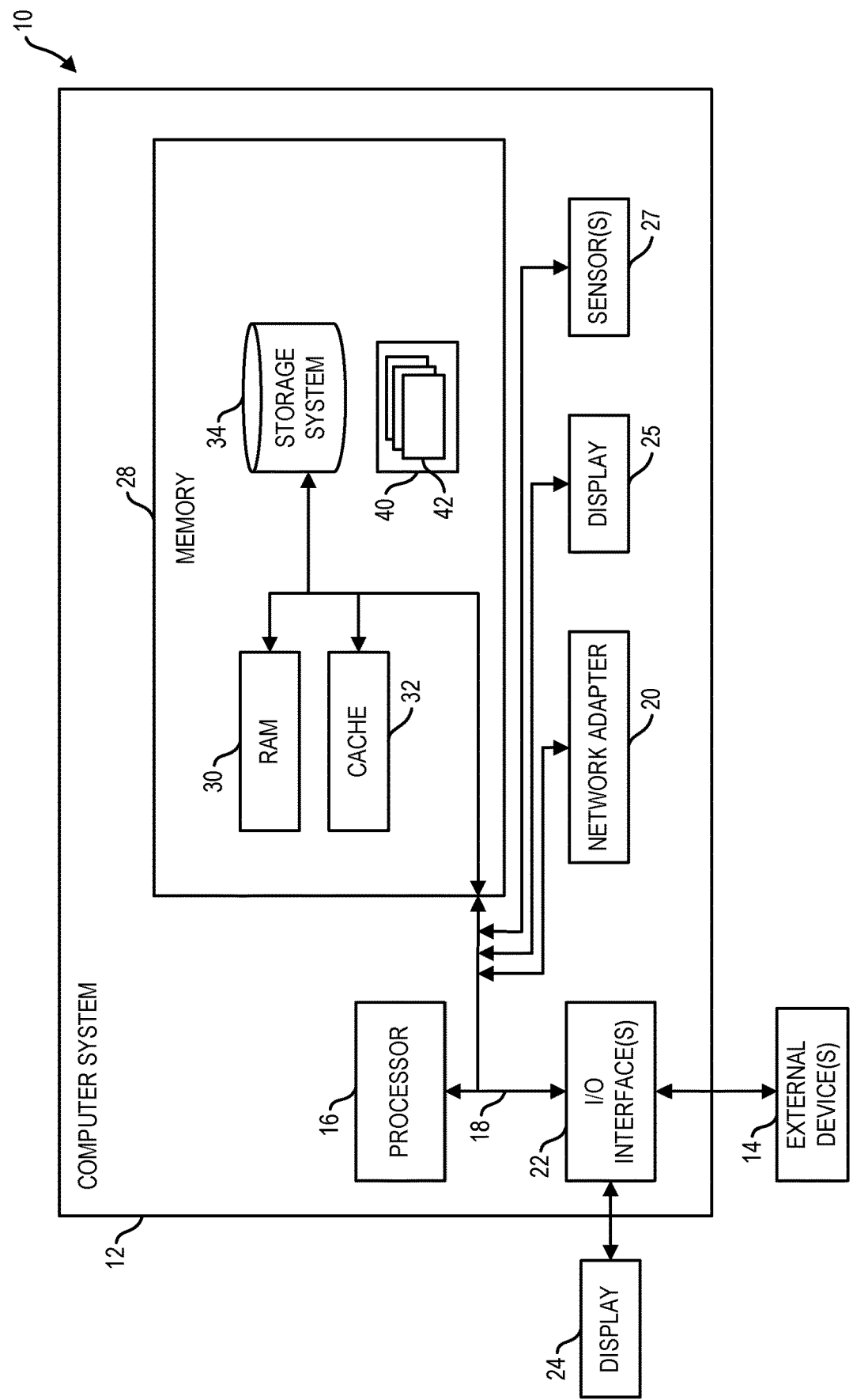
FIG. 6 is a block diagram of one example of a computer system, in accordance with one or more aspects of the present disclosure.
Figure 7:
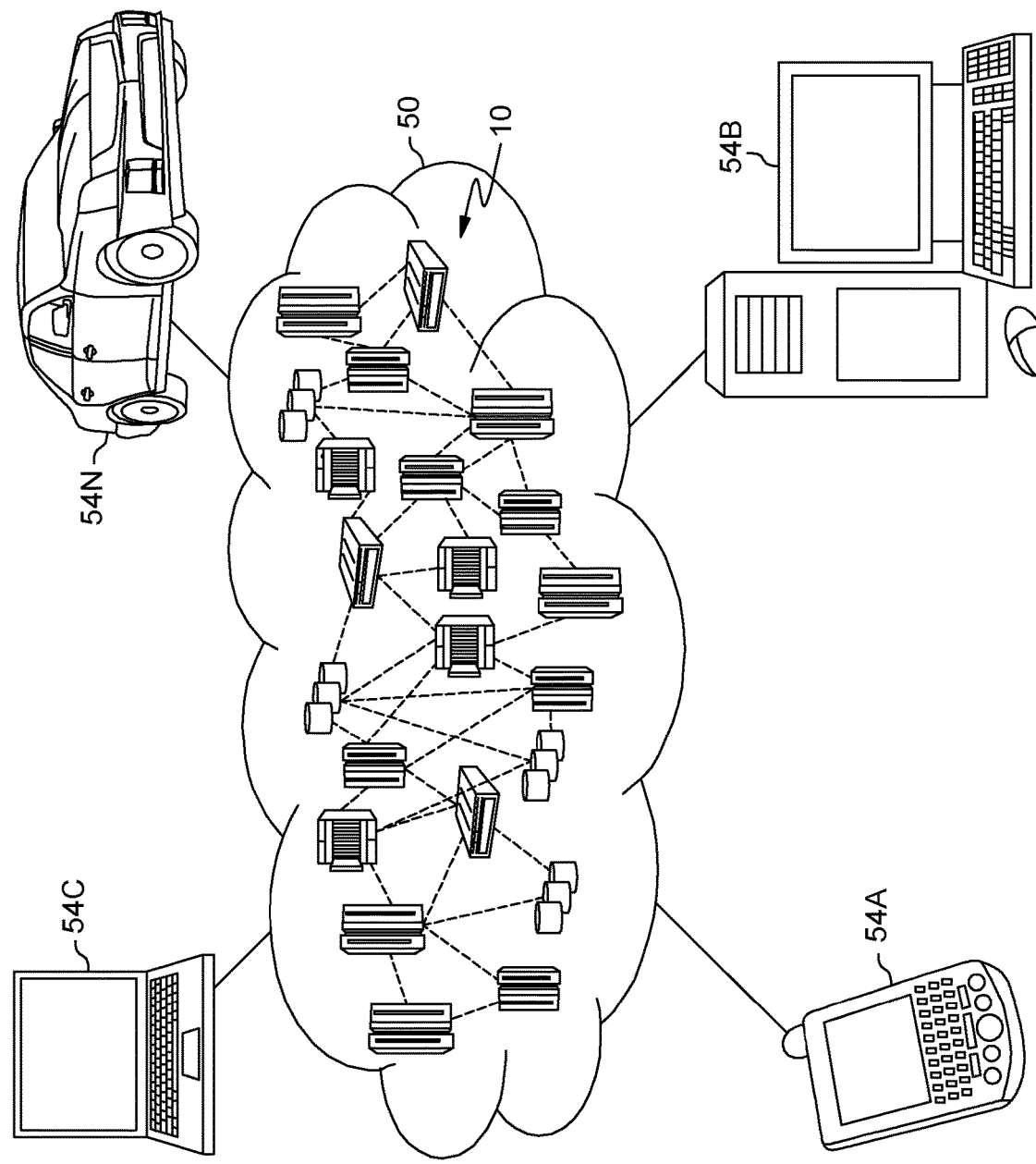
FIG. 7 is a block diagram of one example of a cloud computing environment, in accordance with one or more aspects of the present disclosure.
Figure 8:
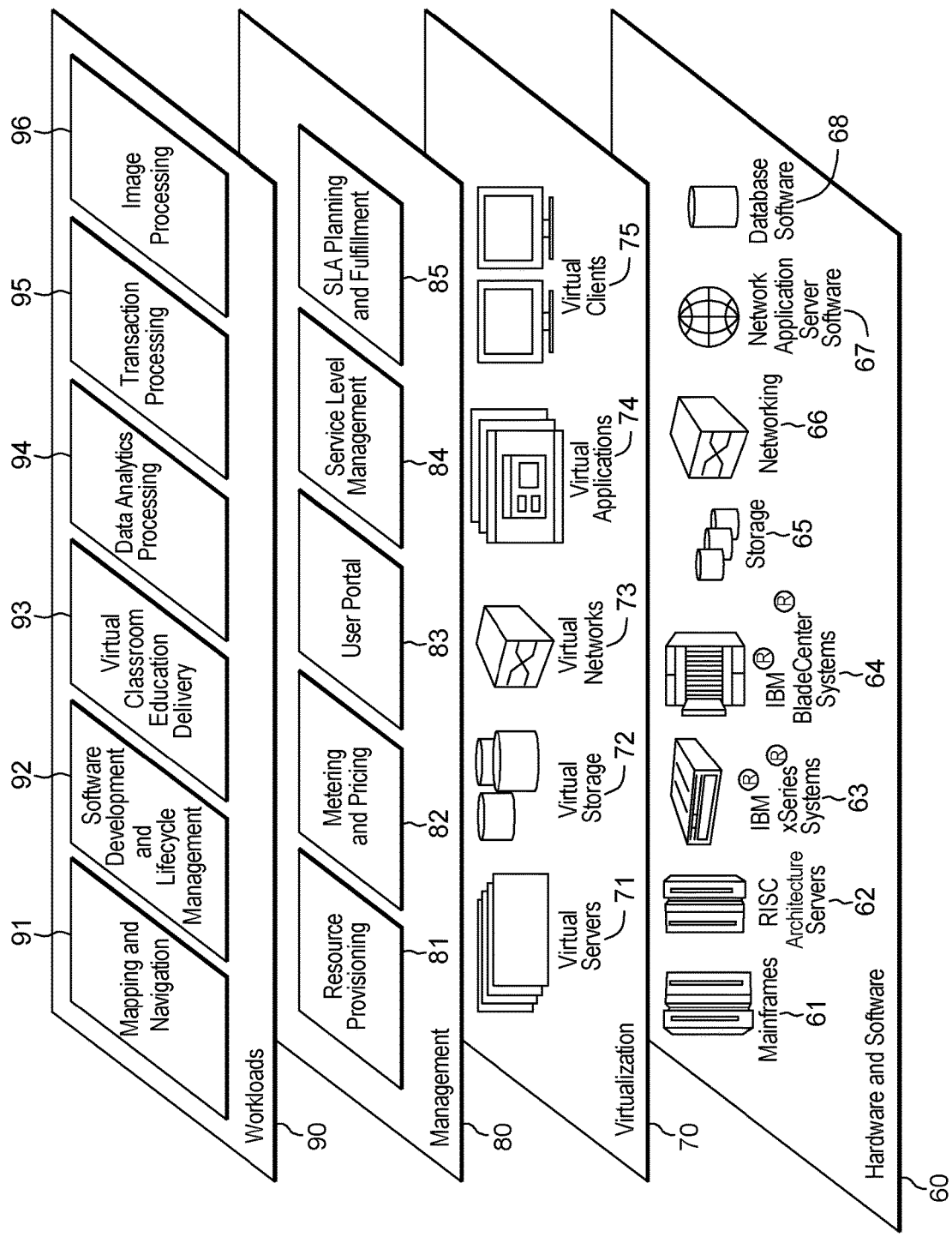
FIG. 8 is a block diagram of one example of functional abstraction layers of the cloud computing environment of FIG. 6, in accordance with one or more aspects of the present disclosure.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components, including system memory 28, to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to FIGS. 1-5. In the context of an enclave/micro-enclave environment as disclosed herein, e.g., with respect to FIG. 1, the enclave and nested micro-enclaves are a portion of memory 28 in the system of FIG. 6. The hypervisor and ultravisor of FIG. 1 exist as part of the operating system, so they would be present in programs 40 of FIG. 1. Finally, the adapters of FIG. 1 are virtual, so they would also reside in memory 28.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via input/output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or instead of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data.

Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6, computing node 10 is described as being implemented in a cloud computing environment and accordingly is referred to as a cloud computing node in the context of FIG. 6.

Referring now to FIG. 7, one example of a cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. The one or more cloud computing nodes 10 may communicate with one another. They may be grouped (not shown) physically or virtually, in one or more networks, such as Private, Community, Public, or Hybrid clouds as described hereinabove, or a combination thereof.

The above allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses.

Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for facilitating secure memory sharing between enclaves and virtual I/O adapters as set forth herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.\

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements.

Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer-implemented process for secure memory sharing between enclaves and virtual input/output adapters, the computer-implemented process comprising:

providing a system for performing a computer-implemented process for secure memory sharing between enclaves and virtual input/output adapters, wherein the system comprises a host, an enclave and an interrupt virtualization engine, wherein the host comprises a processor and a memory in communication with the processor to perform the computer-implemented process;

in response to a request for the enclave to create a virtual input/output adapter, creating a virtual input/output adapter associated with the enclave, wherein the enclave includes an enclave memory;

in response to receipt of an interrupt from within the system by the interrupt virtualization engine, routing the interrupt directly to the enclave, wherein the routing bypasses the processor;

creating by the enclave a non-sharable micro-enclave, to contain only data, nested within the enclave to use with the virtual input/output adapter, wherein the micro-enclave includes a non-zero portion of the enclave memory that is less that an entirety of the enclave memory, wherein the data of the non-sharable micro-enclave comprises at least one non-executable data segment, and wherein the at least one non-executable data segment comprises a portion of an object file, and creating a second non-sharable micro-enclave, to contain only data, nested within the enclave to use with a second virtual input/output adapter, wherein the second micro-enclave includes a non-zero portion of the enclave memory that is less than an entirety of the enclave memory;

generating a key by a memory encryption engine for the virtual input/output adapter for use by only the virtual input/output adapter; in response to a request to obtain data from the enclave by the virtual input/output adapter, exchanging the key with the non-sharable micro-enclave; in response to receiving the key, decrypting memory of only the non-sharable micro-enclave associated with the virtual input/output adapter to obtain the data; and sending the data from the non-sharable micro-enclave nested within the enclave to the virtual input/output adapter.

2. The computer-implemented process of claim 1, wherein the computer-implemented process is performed concurrently for a plurality of non-sharable micro-enclaves and a corresponding plurality of virtual input/output adapters.

3. The computer-implemented process of claim 1, wherein sending the data comprises using direct memory access.

4. The computer-implemented process of claim 1, wherein sending the data comprises using remote direct memory access.

5. The computer-implemented process of claim 1, wherein sending the data comprises using single-root input/output virtualization.

6. The computer-implemented process of claim 1, further comprising attaching the virtual input/output adapter to the enclave at a time when creating the virtual input/output adapter.

7. The computer-implemented process of claim 1, further comprising attaching the virtual input/output adapter to the enclave dynamically using a hotplug operation, wherein the hotplug operation comprises performing the attaching while the system continues operating and avoids a restart of the system.

8. The computer-implemented process of claim 1, wherein the interrupt includes a routing priority.

9. The method of claim 1, wherein the micro-enclave and virtual input/output adapter define a first micro-enclave and virtual input/output adapter pair, and wherein the second micro-enclave and the second virtual input/output adapter define a second micro-enclave and virtual input/output adapter pair, wherein the generating includes generating a first unique cryptographic key for the first micro-enclave and virtual input/output adapter pair, and wherein the method includes generating a second unique cryptographic key for the second micro-enclave and virtual input/output adapter pair.

10. The method of claim 1, wherein the micro-enclave and virtual input/output adapter define a first micro-enclave and virtual input/output adapter pair, and wherein the second micro-enclave and the second virtual input/output adapter define a second micro-enclave and virtual input/output adapter pair, wherein the generating includes generating by an ultravisor a first unique cryptographic key for the first micro-enclave and virtual input/output adapter pair, and wherein the method includes generating by the ultravisor a second unique cryptographic key for the second micro-enclave and virtual input/output adapter pair.

11. A computer program product for facilitating secure memory sharing between enclaves and virtual input/output adapters, the computer program product comprising:
a non-transitory storage medium readable by a processor of a host within a system, the system further comprising an enclave and an interrupt virtualization engine, the non-transitory storage medium storing instructions for performing a method of secure memory sharing between enclaves and virtual input/output adapters, the method comprising:
in response to a request for the enclave to create a virtual input/output adapter, creating a virtual input/output adapter associated with the enclave;
in response to receipt of an interrupt from within the system by the interrupt virtualization engine, routing the interrupt directly to the enclave, wherein the routing bypasses the processor;
creating a non-sharable micro-enclave, to contain only data, nested within the enclave to use with the virtual input/output adapter, wherein the data of the non-sharable micro-enclave comprises at least one non-executable data segment, and wherein the at least one non-executable data segment comprises a portion of an object file; and creating a second non-shareable micro-enclave, to contain only data, nested within the enclave to use with a second virtual input/output adapter, wherein the second micro-enclave includes a non-zero portion of the enclave memory that is less than an entirety of the enclave memory;
generating a key by a memory encryption engine for the virtual input/output adapter for use by only the virtual input/output adapter;
in response to a request to obtain data from the enclave by the virtual input/output adapter, exchanging the key with the non-sharable micro-enclave;
in response to receiving the key, decrypting memory of only the non-sharable micro-enclave associated with the virtual input/output adapter to obtain the data; and
sending the data from the non-sharable micro-enclave nested within the enclave to the virtual input/output adapter.

12. A system for secure memory sharing between enclaves and input/output adapters, the system comprising:
a host, an enclave and an interrupt virtualization engine, wherein the host comprises:
at least one processor; and
a memory in communication with the at least one processor to perform a method of secure memory sharing between enclaves and virtual input/output adapters, the method comprising:
in response to a request for the enclave to create a virtual input/output adapter, creating a virtual input/output adapter associated with the enclave;
in response to receipt of an interrupt from within the system by the interrupt virtualization engine, routing the interrupt directly to the enclave, wherein the routing bypasses the processor;
creating a non-sharable micro-enclave, to contain only data, nested within the enclave to use with the virtual input/output adapter; and creating a second non-shareable micro-enclave, to contain only data, nested within the enclave to use with a second virtual input/output adapter, wherein the second micro-enclave includes a non-zero portion of the enclave memory that is less than an entirety of the enclave memory;
generating a key by a memory encryption engine for the virtual input/output adapter for use by only the virtual input/output adapter;
in response to a request to obtain data from the enclave by the virtual input/output adapter, exchanging the key with the non-sharable micro-enclave;
in response to receiving the key, decrypting memory of only the non-sharable micro-enclave associated with the virtual input/output adapter to obtain the data; and
sending the data from the non-sharable micro-enclave nested within the enclave to the virtual input/output adapter.

13. The system of claim 12, wherein the method is performed concurrently for a plurality of non-sharable micro-enclaves and a corresponding plurality of virtual input/output adapters.

14. The system of claim 12, wherein sending the data comprises using at least one of direct memory access, remote direct memory access and single-root input/output virtualization.

15. The system of claim 12, further comprising attaching the virtual input/output adapter to the enclave at a time when creating the virtual input/output adapter.

16. The system of claim 12, further comprising attaching the virtual input/output adapter to the enclave dynamically using a hotplug operation, wherein the hotplug operation comprises performing the attaching while the system continues operating and avoids a restart of the system.

17. The system of claim 12, wherein the enclave includes an enclave memory, and wherein the micro-enclave includes a non-zero portion of the enclave memory that is less that an entirety of the enclave memory, wherein the method includes creating a second non-sharable micro-enclave, to contain only data, nested within the enclave to use with a second virtual input/output adapter, wherein the second micro-enclave includes a non-zero portion of the enclave memory that is less that an entirety of the enclave memory, wherein the second micro-enclave includes a non-zero portion of the enclave memory that is less that an entirety of the enclave memory.

18. The system of claim 12, wherein the enclave includes an enclave memory, and wherein the micro-enclave and virtual input/output adapter define a first micro-enclave and virtual input/output adapter pair, and wherein the second micro-enclave and the second virtual input/output adapter define a second micro-enclave and virtual input/output adapter pair, wherein the generating includes generating a first unique cryptographic key for the first micro-enclave and virtual input/output adapter pair, and wherein the method includes generating a second unique cryptographic key for the second micro-enclave and virtual input/output adapter pair.

19. The system of claim 12, wherein the enclave runs on an ultravisor and includes an enclave memory.

* * * * *